United States Patent [19]
Rousselet et al.

[11] 3,748,911
[45] July 31, 1973

[54] DEVICE FOR TAKING SAMPLES OF LIQUID SPECIMENS ESPECIALLY FOR THE AUTOMATIC ANALYSIS APPARATUS

[75] Inventors: Andre Rousselet, Eaubonne; Pierre Durand, Fresnes, both of France

[73] Assignee: Hoffmann-La Roche Inc., Nutley, N.J.

[22] Filed: Dec. 29, 1971

[21] Appl. No.: 213,526

[30] Foreign Application Priority Data

Dec. 29, 1970 France.........................7047006

[52] U.S. Cl.............................................. 73/423 A
[51] Int. Cl............................................. G01r 1/16
[58] Field of Search................................. 73/423 A

[56] References Cited
UNITED STATES PATENTS

| | | | |
|---|---|---|---|
| 3,552,212 | 1/1971 | Ohlin................................. | 73/423 A |
| 3,327,535 | 6/1967 | Sequiera............................ | 73/423 A |
| 3,251,229 | 5/1966 | Isreeli............................... | 73/423 A |

Primary Examiner—S. Clement Swisher
Attorney—Samuel L. Welt, Jacob Frank et al.

[57] ABSTRACT

A device for taking samples of liquid specimens, such as blood, microbiological suspension and the like for use with an automatic analysis apparatus. The device comprises a sampling head including a hollow needle connected to a pump at one end. The needle is fixed to a support mounted for movement with an endless belt with horizontal and vertical sides in two perpendicular directions. Means are provided for washing the exterior of the needle and are mounted for movement with the needle in one of the perpendicular directions; they comprise a block with bores, one of the bores being connected to a tube carrying a washing liquid thereto and another of the bores being connected to a tube carrying the washing liquid away therefrom. Optical or electrical means may be provided for positioning the needle relative to a test tube containing the liquid to be analysed.

6 Claims, 8 Drawing Figures

PATENTED JUL 31 1973    3,748,911
SHEET 1 OF 3
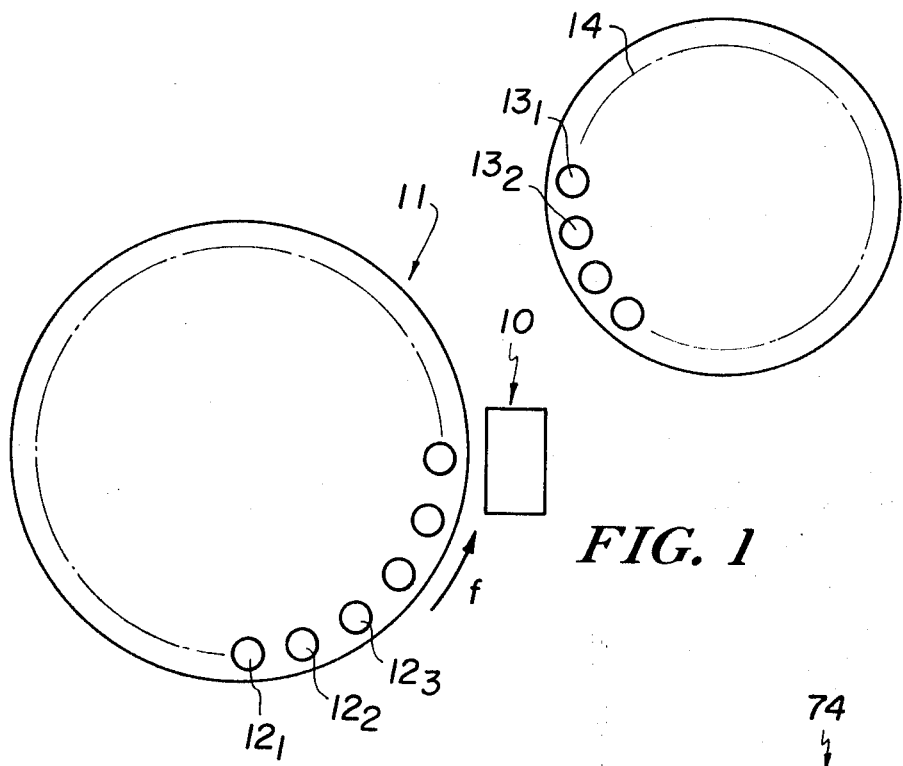
FIG. 1
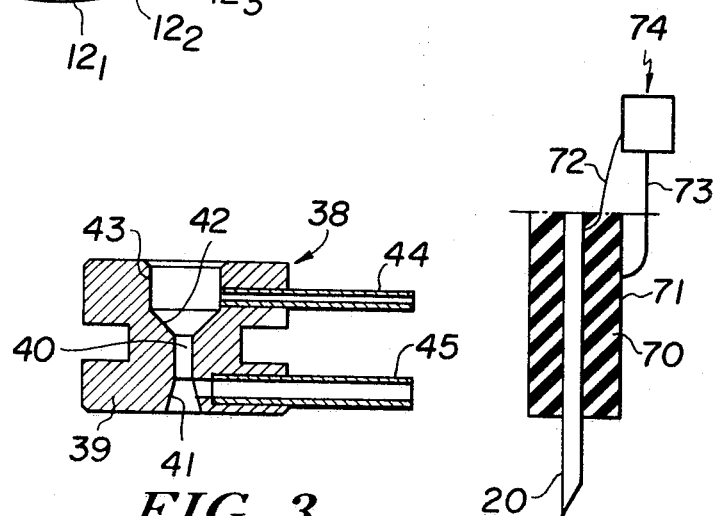
FIG. 3
FIG. 6

DEVICE FOR TAKING SAMPLES OF LIQUID SPECIMENS ESPECIALLY FOR THE AUTOMATIC ANALYSIS APPARATUS

The invention relates to a sampling device for liquid specimens, particularly for automatic analysis apparatus having a hollow needle for taking a sample connected at an end to a pump.

Automatic analysis apparatus, in particular for the biochemical analysis of blood, are known which comprise a first plurality of test tubes on a support containing liquid specimens to be analysed, and in which fractions of the liquid specimens must be taken by a sampling device to be transferred into a second plurality of test tubes, for example for diluting or adding fractions of appropriate reagents thereto.

Such a sampling device must satisfy a number of conditions, in particular : allow the successive taking of fractions of different types of specimens which requires interior and exterior washing of the sampling head, generally a hollow needle connected at an end to a pump, for example of the peristaltic type.

An object of the present invention is to provide a sampling device whose operation is sure and simple which satisfies the required condition, in particular with respect to washing the sampling head inside and outside.

Another object of the present invention is to provide such a device which operates automatically to take samples of the specimens to be analysed.

According to the invention the needle is fixed to a movable support, means for washing the outside of the needle moving at least in part with said needle.

Preferably, and according to a further feature of the device, the movable support is adapted to be driven in two perpendicular directions, the washing means being movable with the needle in one of these two directions.

The invention will be fully understood by the desception which follows made by way for example and with reference to the accompanying drawings, in which :

FIG. 1 is a diagrammatic showing of an automatic analysis apparatus comprising the device according to the invention ;

FIG. 3 is a sectional view on a larger scale of a device for washing the outside of the sampling head for the device according to the invention ;

FIG. 6 is a schematic view of a sampling head for still another embodiment ;

Figure 2:
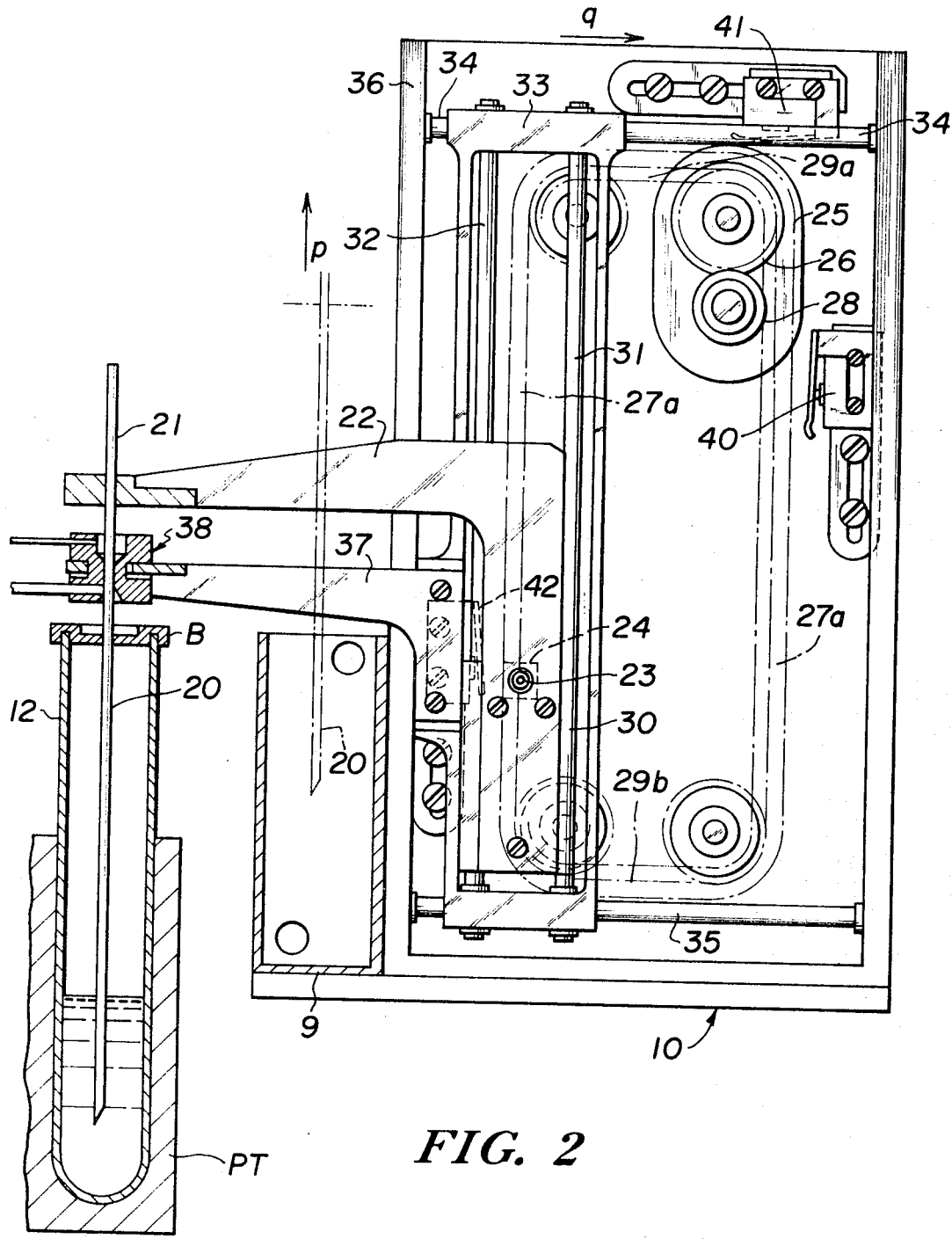
FIG. 2 is a view partly in elevation and partly in section of an embodiment of the device according to the invention.

Reference is first made to FIG. 1 which shows diagrammatically an analysis apparatus comprising a table 11 driven for rotation in the direction of the arrow f and which has at its periphery a first plurality of containers $12_1$, $12_2$, etc., such as test tubes removably secured thereto. The containers 12 contain liquid specimens to be analysed which must be partially decanted or transferred into a second plurality of containers 13 on a second table 14 where they are, for example, diluted or mixed with appropriate reagents for their analysis. The liquid in the containers 12 may be blood, one of its constituents such as plasma, or another organic liquid. It may also be, for example, a microbiological suspension.

During the rotation of the table 11 which is preferably step-by-step the containers 12 pass in succession in front of a sampling device 10 by means of which fractions of the contents of containers $12_1$, $12_2$, etc., are brought to the containers $13_1$, $13_2$, etc., respectively. The device 10 (FIG. 2) comprises a hollow needle 20 or sampling head one end 21 of which is connected by a tube (not illustrated) to a pump, for example a peristaltic pump. The sampling head 20 is carried by a bracket 22 secured to a pivot 23 on a link 24 of an endless chain belt 25 with vertical sides 27a, 27b and horizontal sides 29a, 29b driven by a gear wheel 26 connected to a suitable transmission comprising a pinion gear 28 with a motor (not shown).

The bracket 22 is secured to a plate 30 slidably mounted on two tracks 31, 32 on a frame 33 which in turn is slidably mounted in a direction perpendicular to the tracks 31, 32 on guiding rods 34, and 35 fixed on the housing 36 of the device.

A second bracket 37, carrying at its free end a device 38 for washing the outside of the needle, is mounted on a frame 33. The device 38, (FIG. 3), comprises a block 39 with a bored cylindrical passage 40 having a diameter slightly greater than the outer diameter of the needle 20 which is extended downwardly by a truncated conical orifice 41 and upwardly by a truncated conical orifice 42 with a cylindrical bore 43 at its top. A small diameter pipe 44 carrying liquid for washing is discharged in the bore 43, and a pipe 45 having a diameter larger than that of the pipe 44 and connected to a suction source is in communication with the orifice 41.

The operation of the device is as follows :

Starting from the solid-line position shown in FIG. 2 in which the sampling head extends into a tube 12 mounted on a test tube holder PT for taking a fractional sample of the contents of the test tube, the belt 25 is set into motion, the plate 30 integral with the pivot 23 undergoes translatory movement in the direction of the arrow P guided by the tracks 31 and 32 carrying the bracket 22 and the sampling head 20 which passes through the washing device 38, which is then not in motion nor is the frame 33 to which it is fixed by the bracket 37.

During this phase of the operation, the liquid taken from the test tube 12 is carried to a container 13. In addition, the introduction of a washing liquid through the small diameter pipe 44 into the device 38 and the discharge through from the device 38 by the pipe 45 of larger diameter causes, owing to the shape of the bores 41, 42, 43, a vortex movement of the liquid which ensures satisfactory washing of the outside of the needle 20.

When the link 24 moves along the upper horizontal side 29a of the endless belt 25, the pivot is displaced in the direction of the arrow q, perpendicular to the arrow p, slidingly displacing the frame 33 along the rods 34 and 35. This movement of the frame 33 which is also common to the bracket 37 and the washing device 38 continues untill the sampling head 20 reaches the position shown in dash-dotted lines in FIG. 2 in which the sampling head 20 is in line with the container 9 containing a liquid for washing the interior of the sampling head. The plate 30 is then displaced in the direction opposite that of the arrow p until the sampling head 20 is at least partially immersed in the washing liquid in the container 9. The peristaltic pump pumps through the sampling head 20 the amount of liquid contained in the container 9, the discharge of this liquid ensuring the washing of the interior of the sampling head.

A micro-switch 40 controls the movement of the belt 25 in the opposite direction causing the upward movement of the sampling head 20 with a further pass through the exterior washing device ; the movement of the belt 25 continuing, the frame 33 is displaced in the direction opposite to that of the arrow q, then it stops by the actuation of a micro-switch 41 when the needle 20 is once again in line above the test tube 12. A programming device (not illustrated) then brings another test tube 12 containing another specimen to be sampled in position under the sampling head 20, and controls the movement of the belt 25 causing the lowering of the sampling head into the liquid to be sampled from the test tube just brought into line with the sampling head. During the descending movement of the sampling head 20, the latter may puncture a stopper B covering the open end of the test tube 12.

When the plate 30 has returned to the solid-line position shown in FIG. 2, the actuation of the micro-switch 42 causes the belt 25 to stop ; the programming device controls the taking of the liquid to be analysed from the next test tube 12, once this operation has been effectuated, the belt 25 starts moving again in the direction of the arrow p in order to effect once again the above described cycle.

The present device may also be used for effecting the dilution of the samples of the specimens taken from the test tubes 12 automatically. In this case, the container 9 of liquid for washing the interior of the needle is eliminated ; means are provided for the sampling head 20 to receive a diluting liquid which washes the interior of the sampling head ; the means for washing the exterior of the needle being as described above. The container into which the portion of the liquid from the tube 12 is decanted may, in this case, be fixed to the tube carrier PT.

Figure 4:
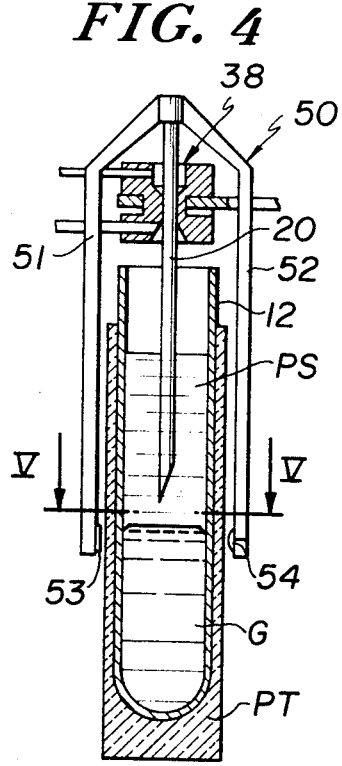
FIG. 4 is a view partly in elevation and partly in section of another embodiment of the device.
Figure 5:
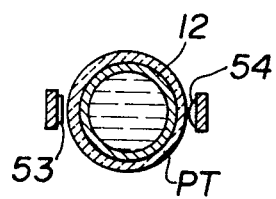
FIG. 5 is a cross section taken along the line V-V in FIG. 4.

In the embodiment shown in FIGS. 4 and 5, an auxiliary positioning device 50 comprising two arms 51 and 52 parallel to the sides of the sampling head adapted to straddle the test tube 12 is associated with the sampling head. The arm 51 carries a photo cell 53 opposite a light source 54 carried by the arm 52.

Such a device for use in particular with sampling devices for blood analysis appratus enables a precis positioning of the sampling head 20 in the test tube 12 containing at its lower end the medium to be analysed, generally an opaque globular mass G, topped with blood plasma PS which is transparent to the light emitted by the source 54.

In a modification, (FIG. 6), the metal needle 20 is surrounded along a part of its length by an electrically insulating sleeve 70, an outer conductive tube 71 is fitted on the sleeve. The needle 20 and the tube 71 are electrically connected by conductors 72 and 73 to an A.C. voltage source 74, the frequency of which is adjusted as a function of the liquid into which the needle is to be immersed, and a device for measuring the resistance by resistivity of the medium into which the needle is to immersed. A precision positioning of the sampling needle 20 in the test tube 12 contained the liquid medium to be analysed is thus obtained as in the embodiment of FIGS. 4 and 5.

Figure 7:
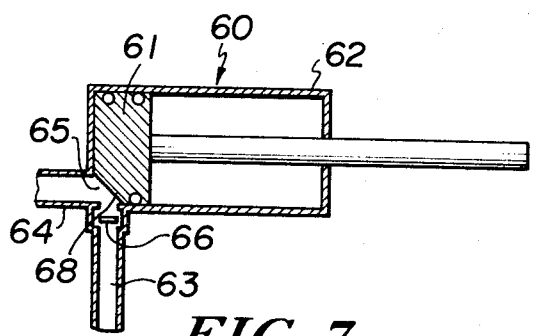
FIG. 7 is a schematic view of a sampling head for a further embodiment.
Figure 8:
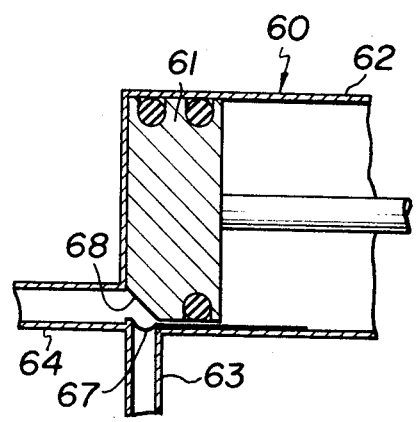
FIG. 8 is a view similar to that of FIG. 7 but for a modification.

Reference is now made to FIG. 7 relative to another improvement of the present device. In this embodiment a syringe device 60 is associated with the hollow sampling needle ; the syringe device comprises a piston 61 slidably mounted in a cylinder 62 in communication with a tube 63 for introducing air for drying and with a tube 64 connected to the needle. The piston 61 has a chamfered edge 68 at its front face for forming in the vicinity of the tubes 63 and 64 a space 65 closed in the direction of the tube 63 by a non-return valve 66 which is substituted by a resilient blade 67 in the modified embodiment of FIG. 8.

After the discharge of the liquid taken by means of the needle, the stream of air under pressure in the tube 63 blows out the amount of liquid remaining in the needle and dries the same thereby ensuring a particularly effective rinsing of the interior of the sampling device.

What is claimed is:

1. A device for taking samples of liquid specimens for use in an automatic analysis apparatus, comprising: a hollow sampling needle adapted to be connected at one end to a pump; a movable support of said needle from a first to second position for respective insertion in a first and second containers; and, means for washing the exterior of said needle operatively connected for movement with said needle from said first to second position.

2. A device for taking samples of liquid specimens for use in an automatic analysis apparatus comprising: a hollow sampling needle adapted to be connected at one end to a pump; a movable support of said needle displaceable for translatory movement in two perpendicular directions; and means for washing the exterior of said needle operatively connected for movement with said needle in one of said directions.

3. A device for taking samples of liquid specimens for use in an automatic analysis apparatus, comprising: a hollow sampling needle adapted to be connected at one end to a pump; movable support means for said needle mounted for movement with an endless belt having horizontal and vertical sides and further including vertical tracks for guiding the translatory movement of the support in one direction, whereby said vertical tracks are fixed to a frame mounted for sliding movement on horizontal tracks fixed to a housing of the device; and, means for washing the exterior of said needle operatively connected for movement at least in part with said needle.

4. A device according to claim 3, wherein the means for washing the exterior of the needle is mounted on an end of a bracket fixed to the frame.

5. A device for taking samples of liquid specimens for use in an automatic analysis apparatus, comprising: a hollow sampling needle adapted to be connected at one end to a pump; container means for the liquid specimen to be sampled; a movable support of said needle; means for washing the exterior of said needle operatively connected for movement at least in part with said needle; and, means for automatically positioning the sampling needle in said container means, including a light source and a transducer sensitive to the light from said source, said light source being mounted on one arm and said transducer being mounted on another arm of a pair of arms extending parallel to said needle.

6. A device for taking samples of liquid specimens for use in an automatic analysis apparatus, comprising: a hollow sampling electrically conductive needle adapted to be connected at one end of a pump; a container provided for the liquid specimen to be sampled; a movable support of said needle; means for washing the exterior of said needle operatively connected for movement at least in part with said needle; and, means for automatically positioning the sample needle in said container including a metal tube extending around the needle and electrically insulated therefrom, the metal tube and the needle being connected to an AC source as well as to means for measuring the resistance of the liquid specimens to be analyzed.

* * * * *